(12) United States Patent
Friedman

(10) Patent No.: US 12,546,130 B2
(45) Date of Patent: Feb. 10, 2026

(54) COMPOSITE PANEL SYSTEM AND A METHOD OF UTILIZING THE COMPOSITE PANEL

(71) Applicant: GENEVA PIPE AND PRECAST COMPANY, Vancouver, WA (US)

(72) Inventor: Jeff Friedman, Reno, NV (US)

(*) Notice: Subject to any disclaimer, the term of this patent is extended or adjusted under 35 U.S.C. 154(b) by 306 days.

(21) Appl. No.: 18/347,242

(22) Filed: Jul. 5, 2023

(65) Prior Publication Data
US 2025/0012104 A1 Jan. 9, 2025

(51) Int. Cl.
| | |
|---|---|
| E04G 23/02 | (2006.01) |
| B32B 3/12 | (2006.01) |
| B32B 5/02 | (2006.01) |
| B32B 5/26 | (2006.01) |
| B32B 27/12 | (2006.01) |

(Continued)

(52) U.S. Cl.
CPC ............... *E04G 23/02* (2013.01); *B32B 3/12* (2013.01); *B32B 5/022* (2013.01); *B32B 5/265* (2021.05); *B32B 27/12* (2013.01); *B32B 27/36* (2013.01); *B32B 37/24* (2013.01); *B32B 2250/40* (2013.01); *B32B 2260/023* (2013.01); *B32B 2260/046* (2013.01); *B32B 2262/0276* (2013.01); *B32B 2262/101* (2013.01); *B32B 2305/076* (2013.01); *B32B 2305/18* (2013.01);
(Continued)

(58) Field of Classification Search
CPC . E04G 23/02; E04G 23/0218; E04G 23/0222; B32B 3/12; B32B 5/022; B32B 5/265; B32B 27/12; B32B 27/36; B32B 37/24; B32B 2250/40; B32B 2260/023; B32B 2260/046; B32B 2262/0276; B32B 2262/101; B32B 2305/076; B32B 2305/18; B32B 2315/085; B32B 2367/00; B32B 2607/00; E02D 37/00
USPC ..... 52/405.3, 426, 514.5, 405.4, 404.2, 363, 52/362, 361, 344
See application file for complete search history.

(56) References Cited

U.S. PATENT DOCUMENTS

| | | | | |
|---|---|---|---|---|
| 147,006 | A | * | 2/1874 | Jackson ................. E04F 13/045 52/363 |
| 3,073,066 | A | * | 1/1963 | Edwards ................. E04F 13/04 206/322 |

(Continued)

FOREIGN PATENT DOCUMENTS

FR 2897378 A1 * 8/2007 ........... E04H 4/0081

*Primary Examiner* — Brent W Herring
(74) *Attorney, Agent, or Firm* — Egbert, McDaniel & Swartz, PLLC

(57) ABSTRACT

Disclosed is a composite panel, and a system and method utilizing the composite panel. The composite panel is a fiber-reinforced plastic panel, wherein a first side of the composite panel fluid is impermeable and non-porous and faces the interior of an existing concrete vault. The second side of the composite panel has a mechanical bonding agent embedded in a polyester resin. When a hardening fill is poured between the second side of the composite panel and the wall of the existing vault, a mechanical bond is formed between the hardening fill and the embedded mechanical bonding agent. A plurality of spacer boards are affixed to the second side and extend toward the wall of the existing vault. A plurality of conduits are formed through the composite panel and the spacer boards, and a plurality of fasteners extend through respective conduits to attach to the wall of the existing vault.

16 Claims, 7 Drawing Sheets

(51) Int. Cl.
B32B 27/36 (2006.01)
B32B 37/24 (2006.01)
(52) U.S. Cl.
CPC ..... *B32B 2315/085* (2013.01); *B32B 2367/00* (2013.01); *B32B 2607/00* (2013.01)

(56) References Cited

U.S. PATENT DOCUMENTS

| | | | | |
|---|---|---|---|---|
| 3,321,884 | A * | 5/1967 | Klau | E04C 2/34 |
| | | | | 52/378 |
| 3,525,189 | A * | 8/1970 | Nelsson | E04F 13/08 |
| | | | | 52/378 |
| 3,881,292 | A * | 5/1975 | Porter | E04B 1/7612 |
| | | | | 52/471 |
| 4,455,801 | A * | 6/1984 | Merritt | E04H 9/10 |
| | | | | 52/309.9 |
| 5,129,135 | A * | 7/1992 | Yoshino | E04G 23/0211 |
| | | | | 29/527.1 |
| 5,758,464 | A * | 6/1998 | Hatton | E04B 1/7675 |
| | | | | 52/510 |
| 8,479,469 | B2 * | 7/2013 | Ciccarelli | E04B 2/8635 |
| | | | | 52/428 |
| 11,377,863 | B1 | 7/2022 | Friesen et al. | |
| 2012/0159883 | A1 * | 6/2012 | Dayton | E04B 1/7629 |
| | | | | 52/309.1 |
| 2012/0233950 | A1 * | 9/2012 | Carr | E04C 5/20 |
| | | | | 52/686 |
| 2015/0059961 | A1 * | 3/2015 | Stewart | C09J 133/08 |
| | | | | 156/92 |

* cited by examiner

COMPOSITE PANEL SYSTEM AND A METHOD OF UTILIZING THE COMPOSITE PANEL

FIELD OF THE INVENTION

The present invention relates to the field of rigid panels cast in place against an existing base wall. The panel system cast against the base wall to optionally provide corrosion protection and structural support to the base wall.

BACKGROUND OF THE INVENTION

In the public works field, a variety of concrete structures may be utilized, including manholes, vaults, rooms, storage spaces and other fluid conduit and holding tank structures. These concrete structures provide access and maintenance to various fluid systems, such as sanitary sewer systems.

As these concrete structures age, their structural integrity may decrease, resulting in leakage from the fluid systems or leakage into the interior of the structure containing the fluid systems. This decrease in structural integrity can be due to a number reasons, such as corrosion and shifting of the ground beneath and around the concrete structures.

Replacement of the concrete structures is costly, time-consuming and otherwise problematic. As such, a need developed to repair or retrofit such structures.

The present Applicant is the owner of U.S. Pat. No. 11,377,863 (hereinafter, the '863 patent), entitled "Aggregate Panel System", which issued on Jul. 5, 2022. The aggregate panel system of the '863 patent utilizes a first rigid panel with a first side comprising a fluid impermeable, nonporous layer, and a second side facing a base wall of the concrete structure. The first rigid panel is attached to the wall of the base structure. An aggregate fill (for example concrete) is poured in a space between the first panel and the base wall to fill the region therebetween. The system of the '863 patent utilizes a number of conical spacers placed between the rigid panel and the base wall. A plurality of fasteners are disposed through the spacers and the rigid panel so as to be attached to the concrete of the base wall. Additionally, the system of the '863 patent utilizes a plurality of panel braces positioned between the rigid panel and the base wall. The panel braces serve several purposes, such as increasing the rigidity of the panel, and providing a means for mechanically bonding the aggregate fill to the rigid panel. In particular, the mechanical bonding is accomplished by a plurality of holes formed through the panel braces such that the aggregate fill can flow through and harden within the holes of the panel braces. In the '863 patent, these panel braces are metal components which are attached to the rigid panel.

The system of the '863 patent has proven effective in retrofitting and sealing concrete structures. However, materials costs associated with the metallic panel braces is seen as a drawback to the system. Attachment of the metallic panel braces to the rigid panel also increases the time and expense associated with production of the system of the '863 patent.

As such, it is an object of the present invention to provide a panel system for concrete structures which overcomes the disadvantages associated with the system of the '863 patent.

It is another object of the present invention to provide a panel system which is relatively quick, easy and inexpensive to install.

It is another object of the present invention provide a panel system which provides a dependable repair to the existing concrete structures.

It is another object of the present invention to provide a panel system which is corrosion resistant.

It is another object of the present invention to provide a panel system wherein a mechanical bond is formed between the rigid panel and hardening fill without the need for specialized bracing.

It is yet another object of the present invention to provide a panel system which utilizes a minimal number of materials.

It is another object of the present invention to provide a panel system which utilizes a composite panel.

In an embodiment, it is an object of the present invention to provide a panel system which is lightweight when compared with previous systems.

These and other objects and advantages of the present invention will become apparent from a reading of the attached specification and appended claims.

BRIEF SUMMARY OF THE INVENTION

The present invention is a composite panel system including a first base wall of an existing vault, wherein the panel system is configured to attach to, reinforce, and seal the first base wall. A first composite panel is provided, having a first side comprising a fluid impermeable, non-porous outer layer. A second side faces the first base wall of the existing vault to which the first panel is attached. The second side has a resin with an embedded mechanical bonding agent. At least one spacer board is fixed to and extends from the second side of the first panel toward the base wall. A void is formed between the second side of the first composite panel and the base wall. A fill is configured to be poured into spaces between the first panel, each spacer board, and the first base wall to fill the voids therebetween. The fill is configured to harden to a solid, and to be mechanically bonded to the second side of the first composite panel when hardened and mechanically bonded to the first base wall. A plurality of transverse conduits are formed through the first composite panel and the at least one spacer board, and each transverse conduit is configured for passage of a fastener therethrough. Each fastener is coupled to the base wall and configured to attach the first panel to the base wall.

In an embodiment, the embedded mechanical bonding agent is selected from a group consisting of: plastic chips, crushed plastic material, and aggregate.

In an embodiment, the first composite panel has a honeycomb layer with fiberglass reinforcing layers. The composite panel may further include at least one polyester fleece layer, wherein the resin layer is applied to the polyester fleece layer.

In an embodiment, the at least one spacer board has a honeycomb layer with fiberglass reinforcing layers.

In an embodiment, the first side of the first composite panel has a roughened perimeter.

In an embodiment, the composite panel system comprises a second composite panel immediately adjacent the first composite panel. The second panel has a roughened perimeter. A fiberglass panel is formed so as to seal the roughened perimeter of the first composite panel to the roughened perimeter of the second composite panel. The second panel may be parallel to the first panel.

In an embodiment, the first composite panel comprises: a first polyester resin layer at the first side thereof, a first polyester fleece layer beneath the first polyester layer; a fiberglass layer beneath the first polyester fleece layer; a center, honeycomb layer; a second fiberglass layer abutting the center, honeycomb layer opposite the first fiberglass layer; a second polyester fleece layer beneath the second fiberglass layer; wherein the resin layer with the embedded mechanical bonding agent abuts the second polyester fleece layer and forms the second side of the first composite panel.

In an embodiment, the fill is high-flow grout. The fill may be another aggregate fill.

The present invention is also a composite panel adapted to mechanically bond to an hardening fill or grout poured adjacent the composite panel. The composite panel comprises: a first polyester resin layer forming a first side of the composite panel; a first polyester fleece layer beneath the first polyester layer; a fiberglass layer beneath the first polyester fleece layer; a center layer comprising a plastic honeycomb material; a second fiberglass layer abutting the center layer opposite the first fiberglass layer; a second polyester fleece layer beneath the second fiberglass layer; a second polyester resin layer beneath the second polyester fleece layer; and an embedded mechanical bonding agent in the second polyester resin layer, the embedded mechanical bonding agent and the second polyester resin layer forming a second side of the composite panel.

The embedded mechanical bonding agent may be plastic chips, crushed plastic or coarse aggregate.

In an embodiment, the plastic honeycomb material comprises polypropylene.

The present invention is also a method for reinforcing an existing vault formed of at least one base wall. The method includes the steps of: providing a first composite panel having: a first side comprising a fluid impermeable, non-porous outer layer; and a second side facing the first base wall to which the first panel is attached, the second side comprising a resin with an embedded mechanical bonding agent; providing at least one spacer board extending from the second side of the first panel and toward the base wall so as to form a gap between each spacer board and the base wall, each the spacer board increasing rigidity of the first panel; providing a plurality of transverse conduits though the first composite panel and the spacer boards; passing a fastener through each conduit to the base wall; coupling each fastener directly to the base wall to attach the first panel to the base wall; pouring a fill into a space between the first panel and the first base wall to fill the space therebetween; allowing the fill to harden to a solid fill; wherein the solid fill is mechanically bonded to the second side of the first panel when hardened and in direct contact with the first base wall.

The embedded mechanical bonding agent may be plastic chips or coarse aggregate.

In an embodiment, the first composite panel comprises: a first polyester resin layer at the first side thereof, a first polyester fleece layer beneath the first polyester layer; a fiberglass layer beneath the first polyester fleece layer; a center, honeycomb layer; a second fiberglass layer abutting the center, honeycomb layer opposite the first fiberglass layer; a second polyester fleece layer beneath the second fiberglass layer; wherein the resin layer with the embedded mechanical bonding agent abuts the second polyester fleece layer and forms the second side of the first composite panel.

In an embodiment, the method of further comprises: positioning a second composite panel adjacent the first composite panel; and applying a fiberglass seal over respective perimeter edges of the first composite panel and second composite panel so as to seal a junction therebetween.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
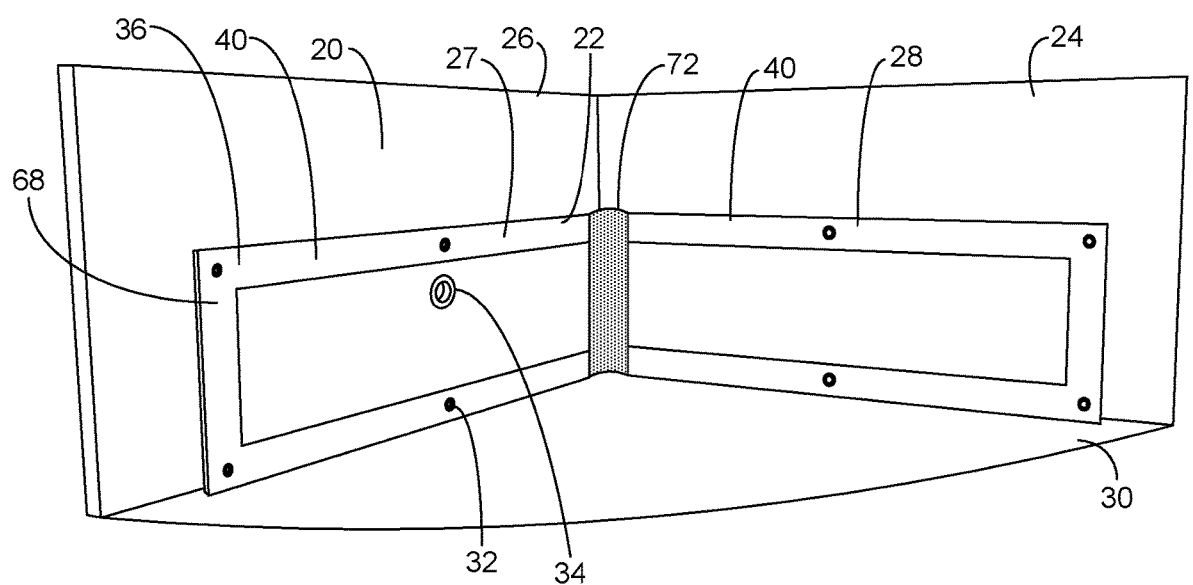
FIG. 1 is a perspective environmental view of the disclosed composite panel system installed in an existing fault.

In the field of base walls used in the construction of structures such as manholes, vaults, rooms, storage spaces, and other fluid conduit and holding tank structures, great advances have been made to improve efficiency, reduce problems, reduce leakage into and out of fluid systems, and to improve the longevity of fluid conveying and holding systems.

In this disclosure, for ease in description, the term "vault" will be used to describe all these structures and equivalents.

As noted above, a great number of base walls of such vaults have been installed which have deteriorated, are expected to deteriorate, or are prone to leakage and failure. In many instances, these problematic base walls need to be repaired or replaced, often with the cost of replacement less than the cost of repair using previously known techniques.

To provide a relatively quick, easy, inexpensive, dependable repair, the composite panel system 20 having a corrosion resistant layer 22 is herein disclosed. Such a composite panel system 20 may be used to structurally reinforce and add corrosion resistance to an existing vault 24 or other fluid structure formed with a base wall 26. In some instances, the disclosed composite panel system 20 may be utilized interior of an existing vault 24.

The term vault used herein encompasses many different structures including structures forming a substantially enclosed chamber extending from a base 30 generally upward to a ground level. Commonly a vault 24 comprises a base 30, one or more base walls 26 extending upward from the base 30, and often a cover (not shown). The vault may also include a cover cap (not shown) which is commonly removable from the vault 24 to allow access to the vault 24. In many instances the vault 24 is large enough to fit an adult person may then enter the vault 24 to access any pipe fixture therein and other components of the vault 24 for inspection, cleaning, or repair. Where the cover in some examples is called a manhole and is the component normally seen by most people the term manhole has become synonymous with the manhole cover but the distinction is intended herein between the components forming the vault 24 and the cover cap.

Figure 2:
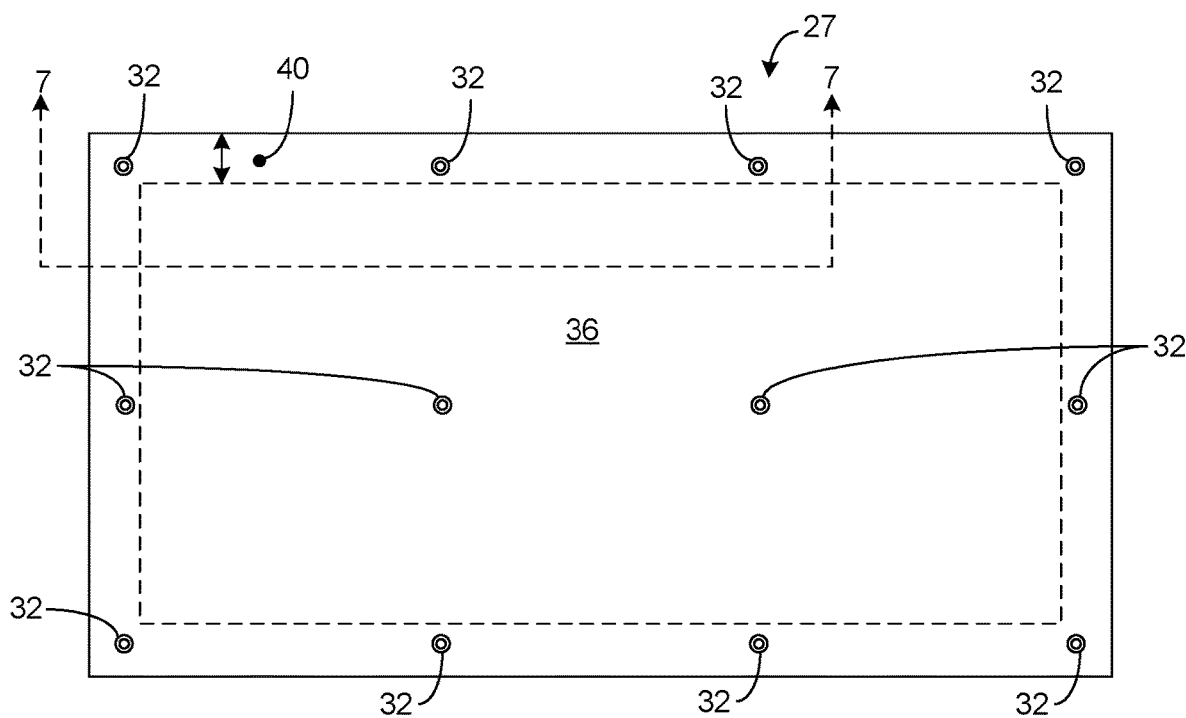
FIG. 2 illustrates the first side of the composite panel of the system of the present invention.

Referring to FIG. 1, there is shown one example of a composite panel system 20 attached to a first base wall 26. This example of the composite panel system 20 comprises a first panel 27 having a first side 36. The first side 36 has a corrosion resistant liner 22. The corrosion resistant liner 22 forms a physical/chemical barrier between fluids (liquids and gasses) within the vault 24 and the first base wall 26. Thus, the corrosion resistant liner 22 provides corrosion and fluid intrusion protection to the base wall 26. This corrosion resistant liner 22 preferably comprises a hardened polymer such as polyester resin. However, other materials may be used, such as: polypropylene, fiber reinforced plastic, gel coat, polyvinylchloride, copper or other metals, natural materials, glass, and equivalents.

Wherein the first panel 27 by itself may not be sufficient to cover the first base wall 26, or where it may be desired to seal the first panel 27 to a second panel 28, to the base 30, to a second base wall, or to other components, the first panel 27 preferably has a roughened area 40 along the perimeter of the panel (see FIG. 2). In one example the second panel 28 is similar, or identical in structure to the first panel 27 and thus all components of the first panel 27 may be provided on the second panel 28 and other panels. This roughened area 40 may be on one side or more than one side as needed.

In one embodiment, the roughened areas 40 of adjacent panels may be attached and sealed to prevent corrosion and fluid seepage therebetween the components. In the example shown in FIG. 1, adjacent roughened areas 40 of the first panel 27 and a second panel 28 are connected and sealed to each other. This is preferably accomplished by applying a fiberglass material 70 at the junction of the first panel 27 and second panel 28.

When sealing the junction between adjacent panels, the fiberglass seal can comprise fiberglass sheets with a resin and a hardener applied to the fiberglass sheets. Further, the areas around the fasteners can be covered with the same type of fiberglass seal or another fiberglass seal.

In many examples, a pipe fixture (not shown) such as a cross-pipe, inlet pipe, outlet pipe, or equivalent extends through the inner surface of the base wall 26. This pipe fixture may in some applications be a section of pipe which has been cut off to enable installation of the composite panel system 20. In other applications it may be a pipe, bell housing, pipe fitting, pipe bell, pipe valve, or other equivalent apparatus. As shown in FIG. 1, an aperture 34 may be provided through the corrosion resistant layer 22 to accommodate the pipe fixture.

Referring to FIG. 2, there is shown the first side 36 of the first panel 27 of the system of the present invention. The first panel 27 is a fiber-reinforced plastic panel, preferably with a polypropylene honeycomb core material. The various layers of the panel 27 are detailed herein below.

The first side 36 of the panel 27 has a fluid impermeable, nonporous outer layer (i.e. liner 22). Further, the material forming the outer layer is designed and tested to resist chemical reagents found in sanitary sewer systems.

FIG. 2 illustrates a plurality of conduits formed through the first panel 27. As will be explained herein below, these conduits are suitable for receipt of fasteners so as to connect the panel 27 to the base wall 26 of the existing fault 24.

FIG. 2 also illustrates the roughened area 40 along the perimeter of the panel 27. This area 40 is roughened prior to installation of the panel 27. This roughening allows for improved connection and sealing between the first panel 27 and any adjacent panels used in the system of the present invention.

Figure 3:
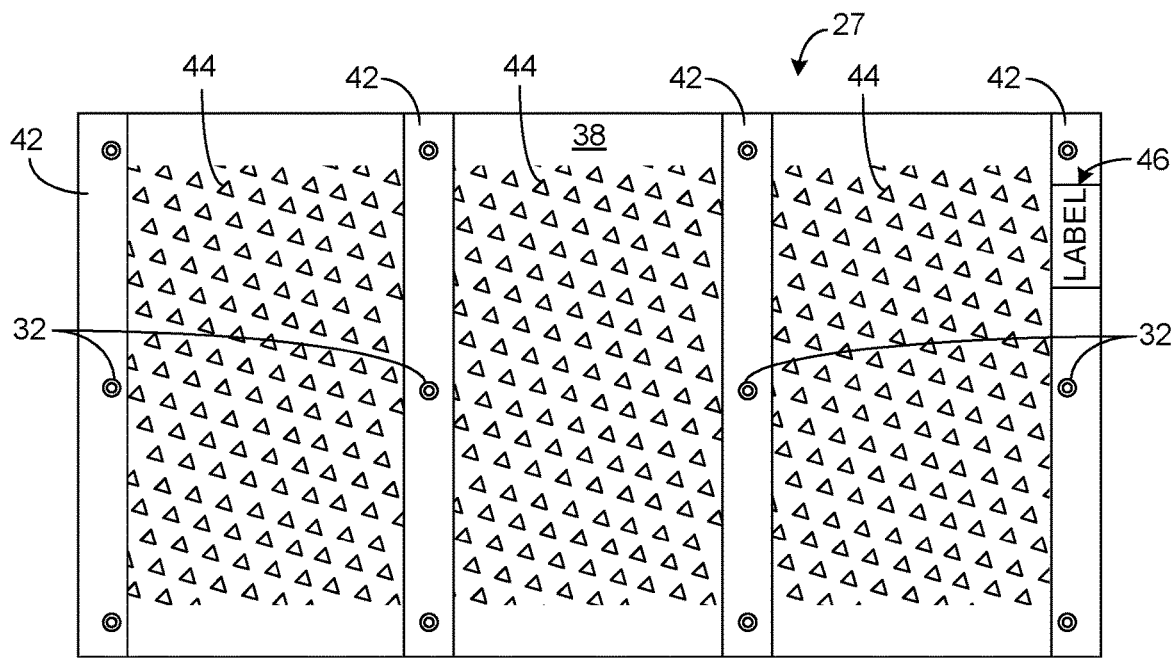
FIG. 3 illustrates the second side of the composite panel of the preferred embodiment of the present invention.

FIG. 3 illustrates the second side 38 of the first panel 27. A plurality of spacer boards 42 are affixed to the second side 38 of the panel 27. As can be seen in FIG. 3, the plurality of conduits 32 visible in FIG. 2 correspond in location to the plurality of spacer boards 42. A label 46 is also shown on the second side 38 of the panel 27.

The second side 38 of the panel 27 is provided an embedded mechanical bonding agent 44. The embedded mechanical bonding agent 44 is not provided on the spacer boards 42 or on portions of the panel 27 where the spacer boards are positioned. This embedded mechanical bonding agent 44 serves to enable mechanical bonding between hardening fill poured adjacent to the mechanical bonding agent 44, as will be explained herein below.

The mechanical bonding agent 44 can comprise a variety of materials. Preferably, the mechanical bonding agent 44 is plastic chips, crushed plastic or coarse aggregate. The use of plastic chips is particularly beneficial in that it provides the necessary mechanical bonding while maintaining a lighter weight when compared to coarse aggregate.

FIG. 3 illustrates spacer boards 42 extending along the entire height of the panel 27. However, in some circumstances, the spacer boards may not extend the entire height of the panel 27. Additionally, in some cases, one or more of the outermost of the spacer boards 42 may be omitted when the panel 27 will abut an adjacent panel during installation.

Figure 4:
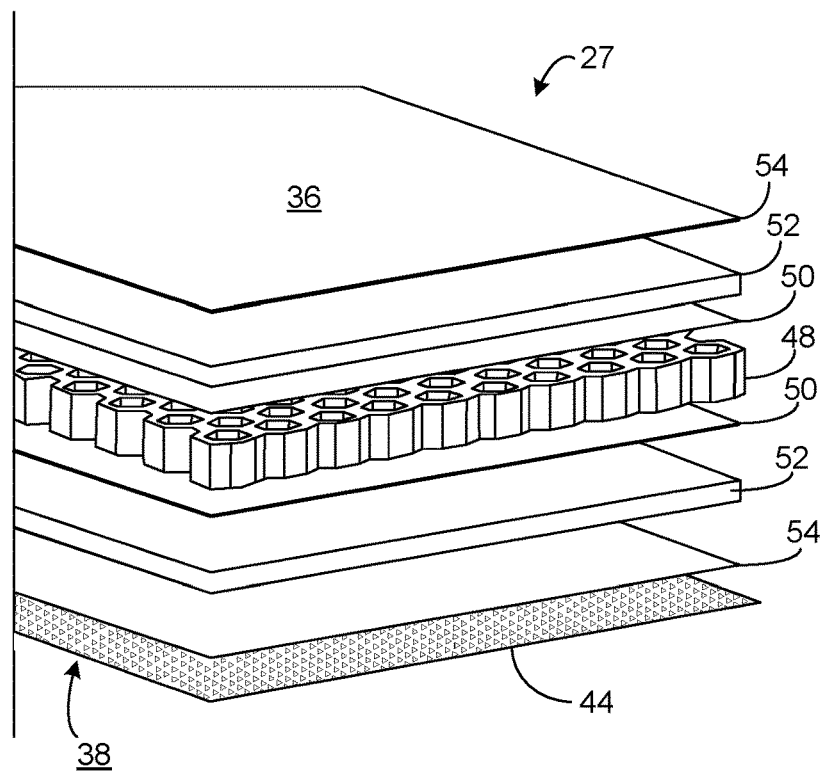
FIG. 4 is a schematic view illustrating the various layers of the composite panel of the present invention.

Referring to FIG. 4, there are shown the various layers of the composite panel 27. The outer layer, which forms the first side 36 of the panel 27, is preferably a polyester resin 54. This polyester resin 54 is applied to a polyester fleece material 52 thereunder. When hardened, the polyester resin 54 forms the nonporous impermeable surface that will face the interior of the fault. Beneath the polyester fleece 52 is a fiberglass layer 50 which is affixed to a honeycomb material 48. The honeycomb material 48 is preferably a polypropylene material. Below the honeycomb material 48 is another fiberglass layer 50, another polyester fleece layer 52, and another polyester resin layer 54.

During the manufacture of the composite panel 27, the mechanical bonding agent 44 is embedded in the polyester resin material 54 so as to form the second side 38 of the composite panel 27. As noted above, this embedded mechanical bonding agent 44 may be plastic chips, crushed plastic or coarse aggregate.

Figure 5:
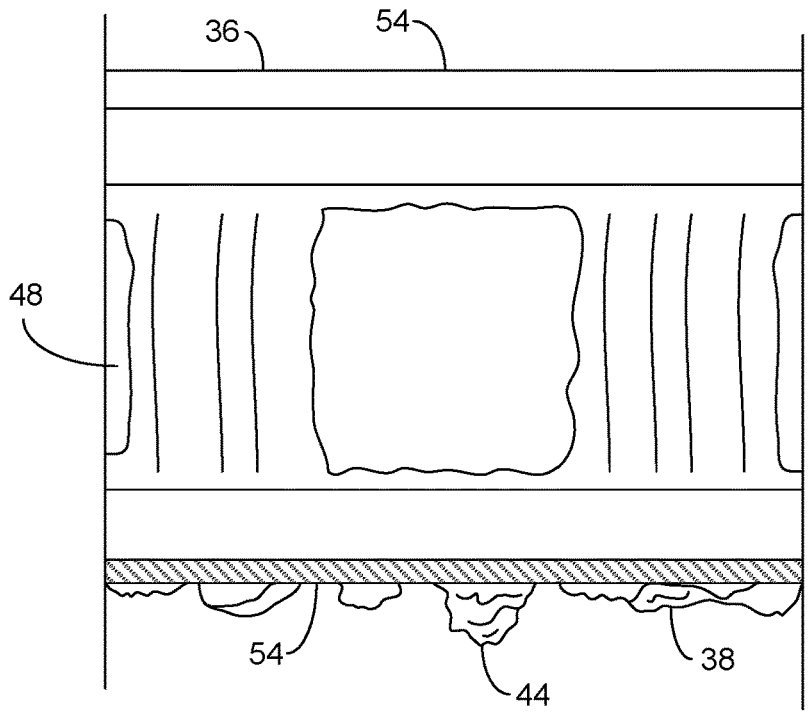
FIG. 5 is a cross-sectional view of the composite panel of preferred embodiment of the present invention.

FIG. 5 illustrates a cross-sectional view of the completed panel 27. In FIG. 5, it can be seen how the embedded mechanical bonding agent 44 (in this case coarse aggregate) extends outwardly from the polyester resin layer 54 on the second side 38. FIG. 5 also illustrates the flat surface of the first side 36 formed by the polyester resin 54. The unique construction of the composite panel 27 provides distinct advantages over previous systems, including those of the '863 patent. The composite panel is lightweight, relatively inexpensive and easy to manufacture, and meets the specific needs and requirements of this application, in particular, having an impermeable corrosion-resistant surface on one side, with a second side which can sufficiently mechanically bonded to a hardening fill.

Figure 6:
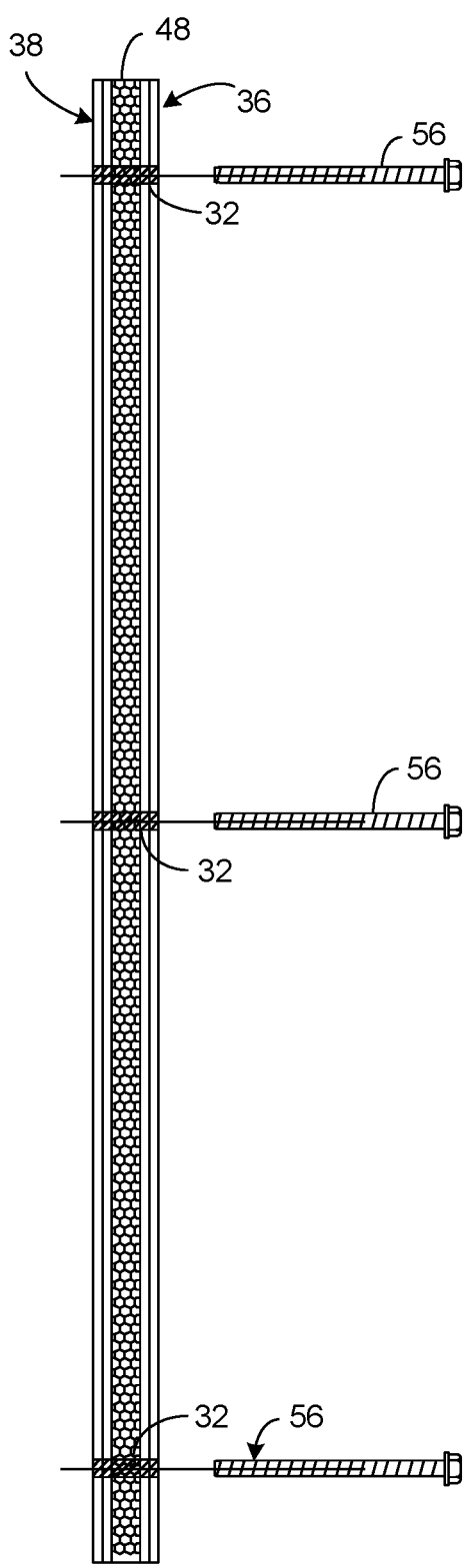
FIG. 6 is a cross-sectional view of the system of the present invention being installed.

FIG. 6 illustrates a cross-sectional view of the installation of the system of the present invention, wherein the spacer boards have been omitted. In FIG. 6, it can be seen how a plurality of fasteners 56 are insertable through the plurality of conduits 32 which are drilled through the first and second side 36 and 38 of the panel 27. Preferably, the conduits are ½ inch in diameter, and ⅜ inch diameter fasteners 56 are used to secure the paneling to the vault. Polyester resin spacers may be provided on the second side 38 of the panel.

Figure 7:
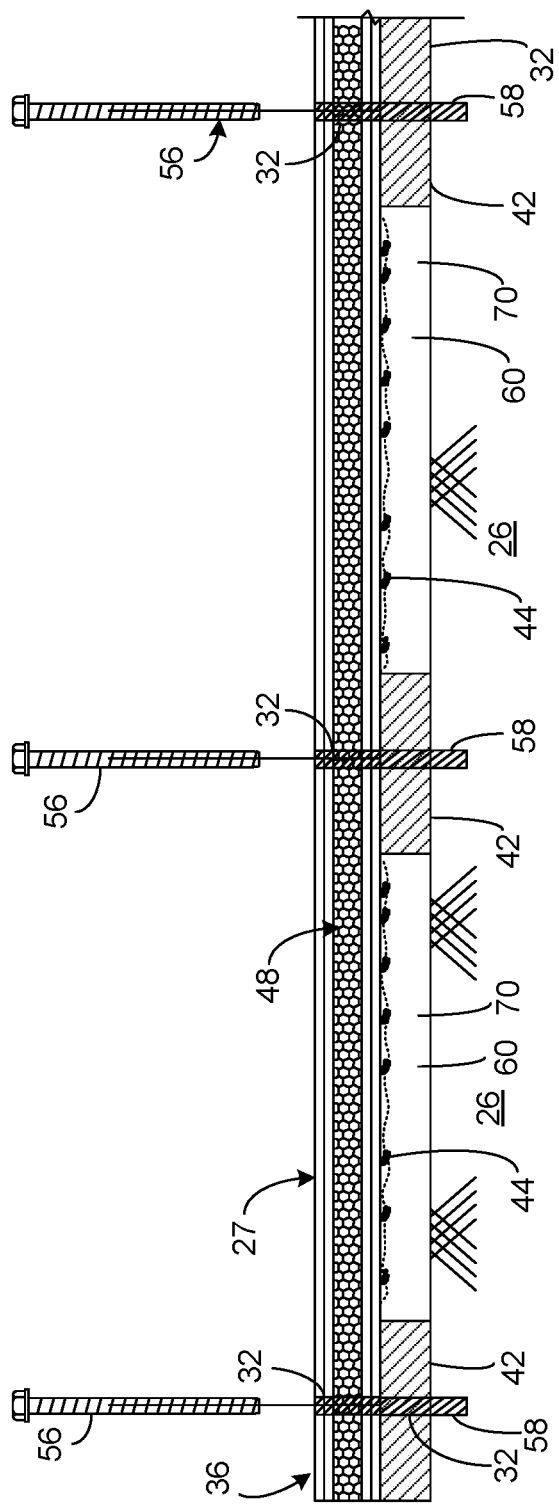
FIG. 7 is a cross-sectional view taken from FIG. 2 of installation of the system of the present invention.

FIG. 7 is a cross-sectional view of the installation of the system of the present invention taken along line 7 of FIG. 2. In FIG. 7, it can be seen how the spacer boards 42 are fixed to an extend from the second side 38 of the panel 27 toward the base wall 26 of the existing vault. Between the second side 38 of the panel 27, adjacent spacer boards 42 and the base wall 26 are voids 60. The embedded mechanical bonding agent 44 can be seen in FIG. 7. Once the fasteners 56 are secured through the conduits 32 and into drilled holes 58 within the base wall 26, a hardening fill 70 is poured into the voids 60. This hardening fill 70 is allowed to harden into a solid, which forms a mechanical bond with the mechanical bonding agent 44 of the second side 38 of the panel 27.

The hardening fill 70 can comprise a number of different types of materials. Preferably, the fill is a high-strength rapid-set ground. Other aggregate fills maybe used.

As can be appreciated, the spacer boards 42 serve the purposes of spacing the panel 27 from the base wall 26, and also increase the rigidity of the panel. The use of fiber-reinforced plastic spacer boards (i.e. the same material as the panels) simplifies the process and reduces costs associated with the system.

Figure 8:
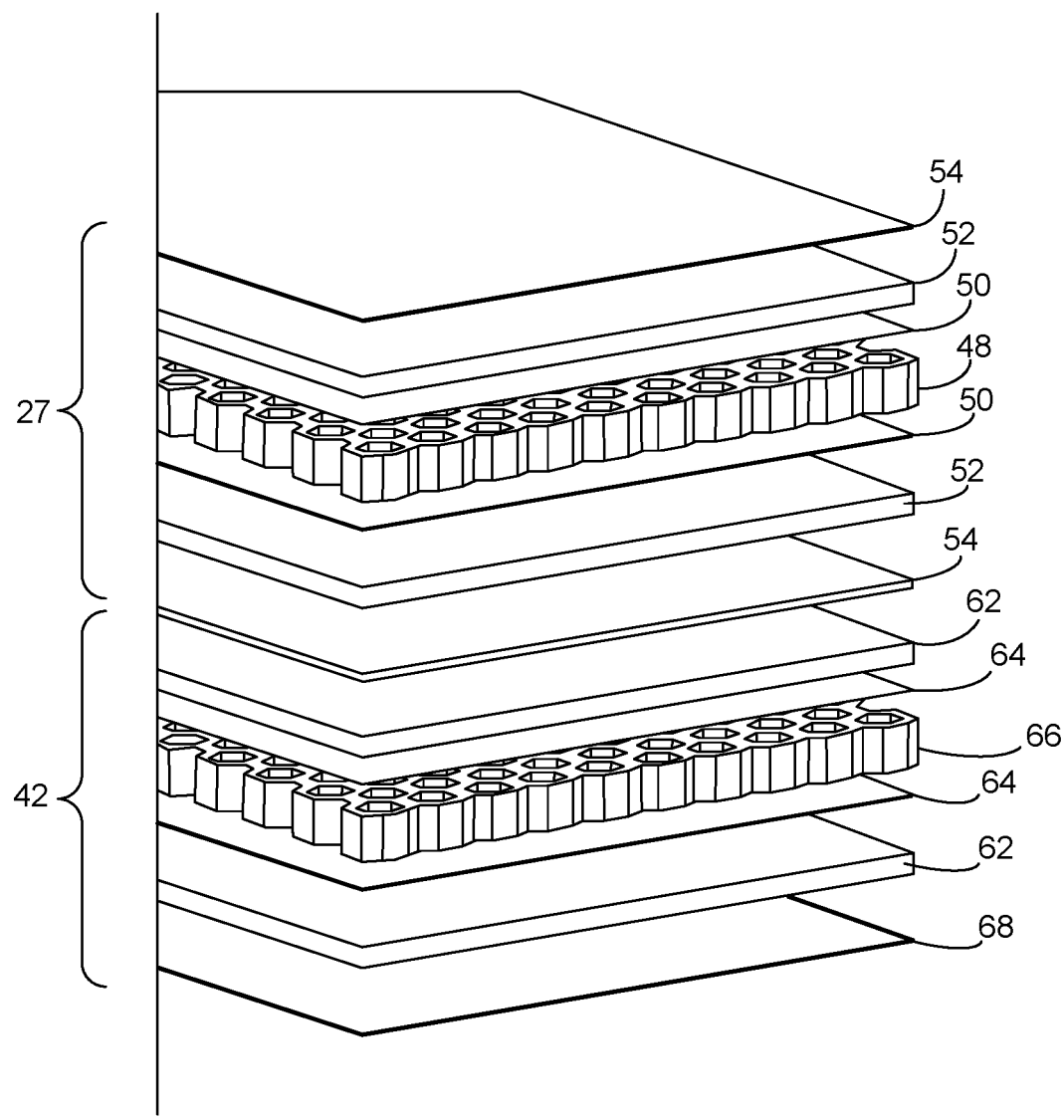
FIG. 8 is a schematic illustrating the layers of the panel and spacer board of the present invention.

FIG. 8 is an exploded view showing the various layers of the first panel 27 and spacer board 42. As shown in FIG. 8, the composite panel 27 and the spacer board 42 share a central polyester resin layer 54. Otherwise, the layers of the composite panel 27 and the spacer board 42 are identical. Note that where the spacer boards are attached to the composite paneling, there is no embedded mechanical bonding agent.

Figure 9:
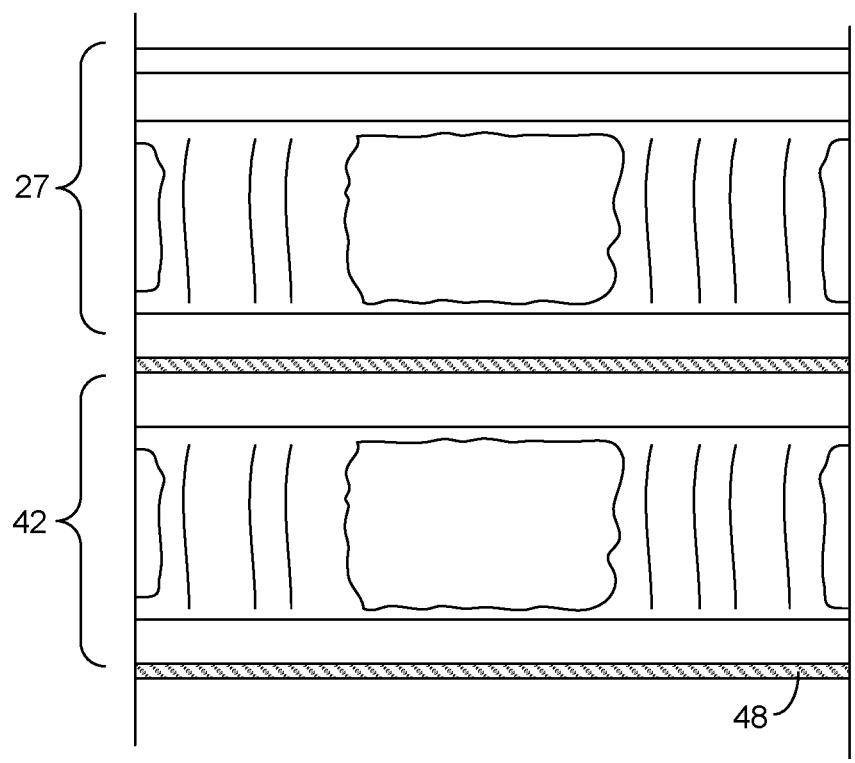
FIG. 9 is a cross-sectional view of the panel and spacer board of the present invention.

The spacer board 42 has a polyester fleece layer 62 bonded to the central polyester resin layer 54. Below the polyester fleece layer 62 are fiberglass layer 64, the honeycomb material core 66, another fiberglass layer 64, an outer polyester fleece layer 62 and finally the polyester resin layer 68, which will abut the base wall 26. FIG. 9 illustrates a cross-sectional view of the arrangement of the first composite panel 27 and the spacer board 42.

The foregoing disclosure and description of the invention is illustrative and explanatory thereof. Various changes in the details of the illustrated construction can be made is the scope of the present invention without departing from the true spirit of the invention.

I claim:

1. A composite panel system comprising:
   a first base wall of an existing vault;
   the panel system configured to attach to, reinforce, and seal the first base wall;
   a first composite panel having: a first side comprising a fluid impermeable, non-porous outer layer; and a second side facing the first base wall of the existing vault to which the first panel is attached, the second side comprising a resin with an embedded mechanical bonding agent;
   at least one spacer board fixed to and extending from the second side of the first composite panel toward the first base wall;
   a void between the second side of the first composite panel and the first base wall;
   a fill configured to be poured into a space between the first panel, each spacer board, and the first base wall to fill the void therebetween;
   the fill configured to harden to a solid;
   the fill configured to be mechanically bonded to the second side of the first composite panel when hardened and mechanically bonded to the first base wall;
   a plurality of transverse conduits formed through the first composite panel and the at least one spacer board;
   each transverse conduit configured for passage of a fastener therethrough; and
   each fastener coupled to the first base wall and configured to attach the first composite panel to the first base wall.

2. The composite panel system of claim 1, the embedded mechanical bonding agent selected from a group consisting of: plastic chips, crushed plastic material, and aggregate.

3. The composite panel system of claim 1, the first composite panel comprising: a honeycomb layer with fiberglass reinforcing layers.

4. The composite panel system of claim 3, the composite panel further comprising: at least one polyester fleece layer, wherein the resin layer is applied to the polyester fleece layer.

5. The composite panel system of claim 1, the at least one spacer board comprising: a honeycomb layer with fiberglass reinforcing layers.

6. The composite panel system of claim 1, wherein the first side of the first composite panel has a roughened perimeter.

7. The composite panel system of claim 1, further comprising: a second composite panel immediately adjacent the first composite panel, the second composite panel having a roughened perimeter; and a fiberglass panel formed so as to seal the roughened perimeter of the first composite panel to the roughened perimeter of the second composite panel.

8. The composite panel system of claim 7, wherein the second composite panel is parallel to the first composite panel.

9. The composite panel system of claim 1, the first composite panel comprising:
   a first polyester resin layer at the first side thereof;
   a first polyester fleece layer beneath the first polyester layer;
   a fiberglass layer beneath the first polyester fleece layer
   a center, honeycomb layer;
   a second fiberglass layer abutting the center, honeycomb layer opposite the first fiberglass layer;
   a second polyester fleece layer beneath the second fiberglass layer;
   wherein the resin layer with the embedded mechanical bonding agent abuts the second polyester fleece layer and forms the second side of the first composite panel.

10. The composite panel system of claim 1, said fill comprising high-flow grout.

11. The composite panel system of claim 1, said fill comprising aggregate fill.

12. A method for reinforcing an existing vault formed of at least one base wall, comprising the steps of:
   providing a first composite panel having: a first side comprising a fluid impermeable, non-porous outer layer; and a second side facing the first base wall to which the first panel is attached, the second side comprising a resin with an embedded mechanical bonding agent;
   providing at least one spacer board extending from the second side of the first panel and toward the base wall so as to form a gap between each spacer board and the base wall;
   each the spacer board increasing rigidity of the first composite panel;

providing a plurality of transverse conduits though the first composite panel and the spacer boards;
passing a fastener through each conduit to the base wall;
coupling each fastener directly to the base wall to attach the first panel to the base wall;
pouring a fill into a space between the first panel and the first base wall to fill the space therebetween;
allowing the fill to harden to a solid fill; and
the solid fill mechanically bonded to the second side of the first panel when hardened and in direct contact with the first base wall.

13. The method of claim 1, the embedded mechanical bonding agent comprising plastic chips.

14. The method of claim 1, the embedded mechanical bonding agent comprising coarse aggregate.

15. The method of claim 1, the first composite panel comprising:
a first polyester resin layer at the first side thereof;
a first polyester fleece layer beneath the first polyester layer;
a fiberglass layer beneath the first polyester fleece layer
a center; honeycomb layer;
a second fiberglass layer abutting the center; honeycomb layer opposite the first fiberglass layer;
a second polyester fleece layer beneath the second fiberglass layer;
wherein the resin layer with the embedded mechanical bonding agent abuts the second polyester fleece layer and forms the second side of the first composite panel.

16. The method of claim 12, further comprising:
positioning a second composite panel adjacent the first composite panel; and
applying a fiberglass seal over respective perimeter edges of the first composite panel and second composite panel so as to seal a junction therebetween.

* * * * *